United States Patent
Turnquist et al.

(10) Patent No.: US 6,547,522 B2
(45) Date of Patent: Apr. 15, 2003

(54) SPRING-BACKED ABRADABLE SEAL FOR TURBOMACHINERY

(75) Inventors: Norman Arnold Turnquist, Sloansville, NY (US); Mahmut Faruk Aksit, Troy, NY (US); Farshad Ghasripoor, Glenville, NY (US); Raymond Edward Chupp, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 5 days.

(21) Appl. No.: 09/681,851

(22) Filed: Jun. 18, 2001

(65) Prior Publication Data

US 2002/0192074 A1 Dec. 19, 2002

(51) Int. Cl.⁷ ................................................ F01D 11/12
(52) U.S. Cl. ............................. 415/173.3; 415/173.4; 415/174.4
(58) Field of Search .................... 415/173.3, 173.4, 415/173.5, 174.4, 174.5; 277/416, 543, 355, 412, 415

(56) References Cited

U.S. PATENT DOCUMENTS

| | | | | |
|---|---|---|---|---|
| 3,879,831 A | * | 4/1975 | Rigney et al. | 277/415 |
| 3,966,356 A | * | 6/1976 | Irwin | 277/545 |
| 4,080,204 A | * | 3/1978 | Panzera | 415/174.4 |
| 4,433,845 A | * | 2/1984 | Shiembob | 277/414 |
| 4,662,821 A | * | 5/1987 | Kervistin et al. | 415/116 |
| 4,867,639 A | | 9/1989 | Strangman | 415/173.4 |
| 5,188,507 A | * | 2/1993 | Sweeney | 415/170.1 |
| 5,196,471 A | | 3/1993 | Rangaswamy et al. | 524/406 |
| 5,314,304 A | * | 5/1994 | Wiebe | 277/414 |
| 5,434,210 A | | 7/1995 | Rangaswamy et al. | 524/406 |
| 5,456,576 A | * | 10/1995 | Lyon | 415/173.3 |
| 5,704,614 A | * | 1/1998 | Sanders et al. | 277/303 |
| 5,749,584 A | * | 5/1998 | Skinner et al. | 415/173.5 |
| 5,927,942 A | * | 7/1999 | Stahl et al. | 415/115 |
| 5,971,400 A | | 10/1999 | Turnquist et al. | 277/416 |
| 6,012,723 A | * | 1/2000 | Beeck | 277/355 |
| 6,027,121 A | | 2/2000 | Cromer et al. | 277/347 |
| 6,105,967 A | | 8/2000 | Turnquist et al. | 277/355 |
| 6,131,910 A | | 10/2000 | Bagepalli et al. | 277/355 |
| 6,340,286 B1 | * | 1/2002 | Aksit et al. | 415/173.3 |

FOREIGN PATENT DOCUMENTS

JP        402298604 A   * 12/1990 ............. 415/173.3

* cited by examiner

Primary Examiner—Edward K. Look
Assistant Examiner—Igor Kershteyn
(74) Attorney, Agent, or Firm—Penny A. Clarke; Patrick K. Patnode (57) ABSTRACT

The present invention provides, in one embodiment, an annular turbine seal for disposition in a turbine between a rotatable component having an axis of rotation and a turbine housing about the same axis of rotation. The turbine seal has a plurality of arcuate seal carrier segments that have an abradable portion secured to the seal carrier segments. In addition, at least one spring is disposed on the seal carrier segment to exert a force and maintain the seal carrier segment adjacent to the rotatable component.

56 Claims, 5 Drawing Sheets fig. 1 fig. 2 fig. 3 fig. 4 fig. 5

SPRING-BACKED ABRADABLE SEAL FOR TURBOMACHINERY

BACKGROUND OF INVENTION

The present invention relates generally to rotary machines, and more particularly to a seal assembly for a rotary machine such as steam and gas turbines.

Rotary machines include, without limitation, turbines for steam turbines and compressors and turbines for gas turbines. A steam turbine has a steam path that typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, a gas path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

It is known in the art of steam turbines to position, singly or a combination, variable clearance labyrinth-seal segments and brush seals in a circumferential array between the rotor of the turbine and the circumferentially surrounding casing to minimize steam-path leakage. Springs hold the segments radially inward against surfaces on the casing that establish radial clearance between seal and rotor but allow segments to move radially outward in the event of rotor contact. While labyrinth seals, singly or in combination with brush seals, have proved to be quite reliable, their performance degrades over time as a result of transient events in which the stationary and rotating components interfere, rubbing the labyrinth teeth into a "mushroom" profile and opening the seal clearance.

Accordingly, there is a need in the art for a rotary machine having good leakage control between stationary and rotating components.

SUMMARY OF INVENTION

The present invention provides, in one embodiment, an annular turbine seal for disposition in a turbine between a rotatable component having an axis of rotation and a turbine housing about the same axis of rotation. The turbine seal has a plurality of arcuate seal carrier segments that have an abradable portion secured to the seal carrier segments. In addition, at least one spring is disposed on the seal carrier segment to exert a force and maintain the seal carrier segment adjacent to the rotatable component.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
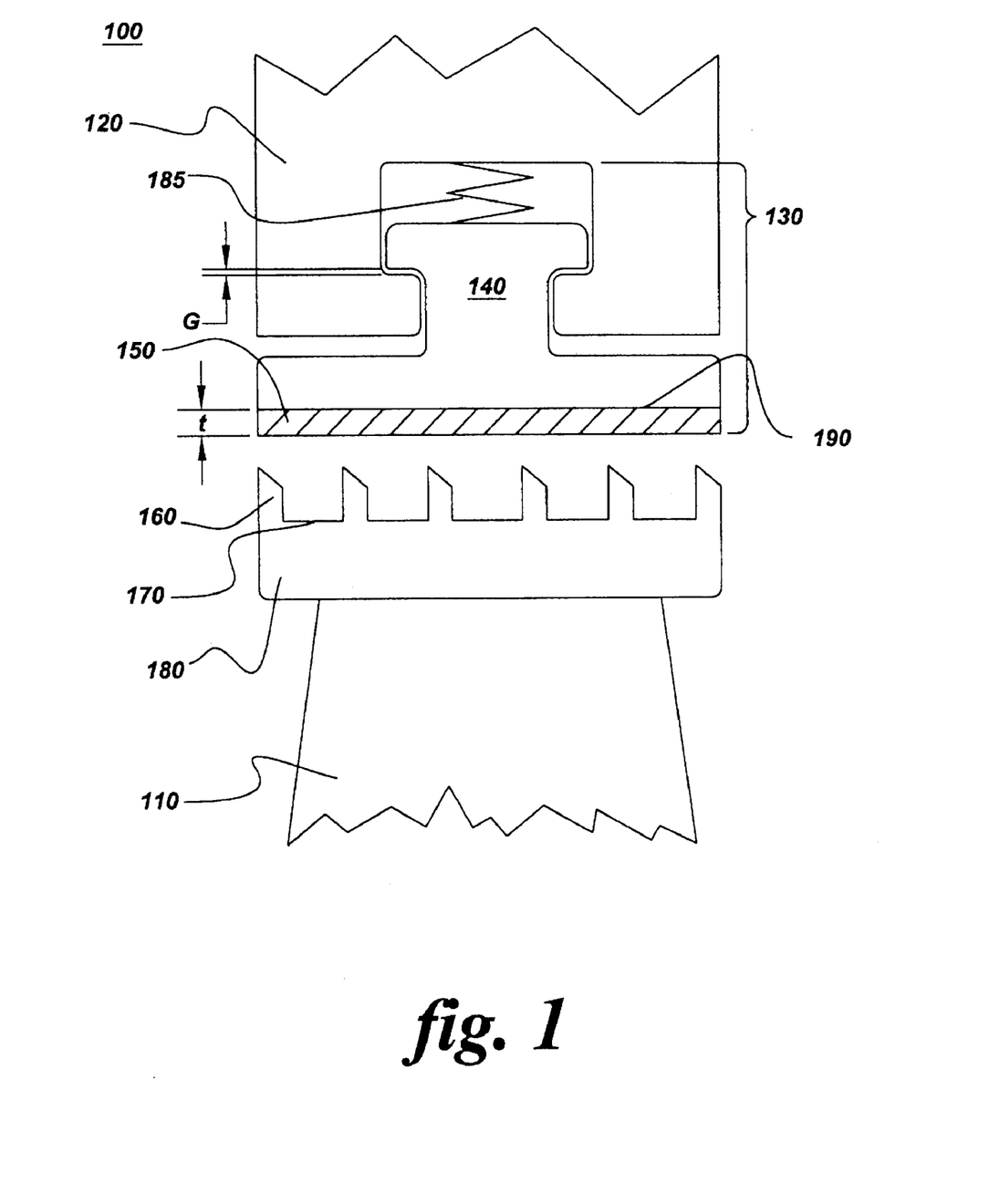
FIG. 1 is a schematic, cross-sectional exploded view of one embodiment of the instant invention.

A rotary machine 100, for example, a steam turbine, typically comprises a rotating turbine bucket 110 disposed in a stationary turbine housing 120 and which turbine bucket 110 is supported by conventional means, not shown, within turbine housing 120 (as shown in FIG. 1). An abradable seal 130, generally designated 130, disposed between rotating turbine bucket 110 and stationary turbine housing 120, comprises an arcuate seal carrier segment 140 disposed adjacent to turbine bucket 110 separating pressure regions on axially opposite sides of arcuate seal carrier segment 140. Arcuate seal carrier segment 140 includes an abradable portion 150 radially disposed on seal carrier segment first surface 190. As used herein, "on", "over", "above", "under" and the like are used to refer to the relative location of elements of rotary machine 100 as illustrated in the Figures and is not meant to be a limitation in any manner with respect to the orientation or operation of rotary machine 100. It will be appreciated that while only one arcuate seal carrier segment 140 and one abradable portion 150 are illustrated, typically a plurality of abradable seals 130 having at least one abradable portion 150 and at least one arcuate seal carrier segment 140 are provided about turbine bucket 110. Abradable portion 150 is of a design for obtaining close clearances with the radial projections or ribs 160 and the grooves 170 of the bucket cover 180. For example, during operation, ribs 160 and grooves 170 wear away part of abradable portion 150 leaving a profile matching that of ribs 160 and grooves 170 on abradable portion 150 resulting in a close clearance between the components. The clearance is typically in the range between about 0.02 mm and about 0.7 mm. It will also be appreciated by one of ordinary skill in the art that the location, number and height of ribs 160 and grooves 170 located on bucket cover 180 may be varied. In addition, turbine bucket 110 components (e.g. bucket cover 180) facing abradable portion 150 may be varied as well, for example, there may not be a bucket cover 180 and therefore the turbine bucket 110 surface may be flat.

Abradable seal 130 segments are typically spring-backed and are thus free to move radially when subjected to movement during normal conditions of startup. For example, abradable seal 130 segments are free to move radially when there is a variance from the normal rotational profile between abradable seal 130 and turbine bucket 110. In one embodiment, springs 185 exert a force to keep abradable seal 130 disposed adjacent to bucket cover 180 and allow some radially outward movement of arcuate seal carrier segment 140 during transient events, for example, during startup and shutdown. Springs 185 typically comprise, but are not limited to, leaf springs or coil springs. Springs 185 apply a radial force, when assembled in the rotary machine, that is typically in the range of about 2 to about 5 times the weight of the arcuate seal carrier segment 140 that it is supporting. In operation, springs 185 only need to provide enough force to seat arcuate seal carrier segment 140 radially toward turbine housing 120 and keep arcuate seal carrier segment 140 disposed adjacent to turbine bucket 110, bucket cover 180 or blades (see FIG. 2). As a result of "seating" arcuate seal carrier segment 140 radially toward turbine housing 120, the gap "G" (see FIG. 1) between seal carrier segment 140 and turbine housing 120 is minimized thus reducing gas or steam leakage in the turbine area of a gas or steam turbine (see FIG. 2). For example, steam turbine applications, the weight of an individual arcuate seal carrier segment 140 is typically in the range of about 10 pounds to about 25 pounds. Thus, springs 185 must provide at least this level of force in order to provide enough force to seat arcuate seal carrier segments 140 radially toward turbine housing 120. In another embodiment, spring 185 is disposed on a plurality of arcuate seal carrier segments 140. In another embodiment, a single spring is disposed on the entire annular array of arcuate seal carrier segments 140.

In another embodiment, the spring system of the present invention is adapted to be used in conjunction with other means to apply pressure to arcuate seal carrier segments 140. For example, springs work in conjunction with gas pressures (illustrated in phantom in FIG. 2) for providing a force to keep abradable seal 130 disposed adjacent to bucket cover 180 or turbine buckets 110. In this embodiment, arcuate seal carrier segment 140 is initially pushed axially toward turbine housing 120 by the upstream pressure which is caused by the expansion of the gas through the turbine and dictated by the design of the gas or steam path geometry and flow (see FIG. 1). This upstream pressure eventually fills the cavity between turbine housing 120 and arcuate seal carrier segment 140 and further forces arcuate seal carrier segment 140 radially inward to reduce the clearance with turbine buckets 110, for example, after the turbine has been brought up to speed. In one embodiment, at least one spring 185 is disposed on each of the arcuate seal carrier segments 140.

In one embodiment, abradable portion 150 composition typically comprises a first component comprising cobalt, nickel, chromium, aluminum, yttrium (hereinafter referred to as CoNiCrAlY) and a second component selected from the group consisting of hexagonal boron nitride (hexagonal BN) and a polymer. Typical polymers used are thermosets, such as polyesters and polyimides. In another embodiment, abradable portion 150 composition typically comprises a component comprising nickel, chromium and aluminum, and another component comprising clay (e.g. bentonite) (hereinafter referred to as "NiCrAl+clay"). Another embodiment is a composition typically comprising a first component consisting nickel and graphite (hereinafter referred to as "Ni+Graphite") or a second component comprising of stainless steel. Another embodiment is a composition typically comprising nickel, chromium, iron, aluminum, boron and nitrogen (hereinafter referred to as "NiCrFeAlBN"). Another embodiment comprises a first component comprising chromium, aluminum and yttrium (hereinafter referred to as "CrAlY") and a second component selected from the group consisting of iron, nickel and cobalt. Furthermore, abradable portion 150 may consist of a composition typically comprising a first component comprising chromium and aluminum (hereinafter referred to as "CrAl") and a second component selected the group consisting of iron, nickel and cobalt. Other embodiments of abradable portion 150 composition may include a material composed of metal fibers that are pressed or sintered together or infiltrated with resin or other material, for example, Feltmetal™ (offered for sale by Technectics Corp., DeLand, Fla.) and a nickel based alloy with high resistance to oxidation, for example, Hastelloy™ (offered for sale by Technectics Corp., DeLand, Fla.). It will be appreciated that abradable portion 150 is disposed on seal carrier segment first surface 190 by brazing or thermal spraying, for example. In addition, it will be appreciated by one of ordinary skill in the art that the thermal spray may be adjusted to introduce porosity into the abradable portion. Operating conditions for abradable portion 150 composition is typically in the range between about 20° C. and about 700° C.

Figure 5:
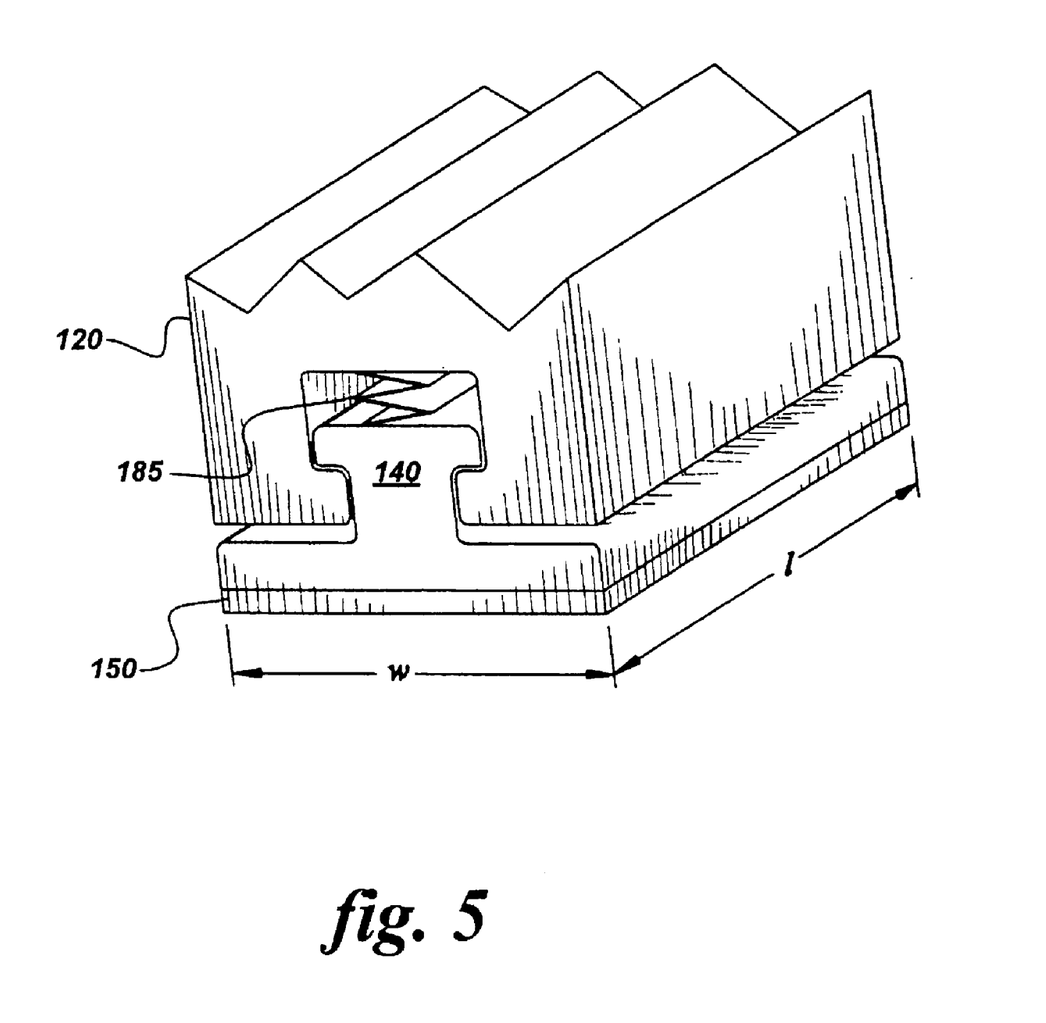
FIG. 5 is a schematic, cross-sectional exploded view of another embodiment of the instant invention.

Referring to FIG. 1, abradable portion 150 nominally projects from arcuate seal carrier segment 140 a distance "t" which corresponds to the maximum expected radial incursion of the turbine buckets 110 or blades into the abradable portion 150 of abradable seal carrier 130 in a radial direction. Consequently, the distance "t" corresponds to the radial deflection of the turbine buckets 110 and its calculation is dependent on the predicted deflection of rotary machine 100 and the radial deflection of arcuate seal carrier segments 140 during transient or steady-state operation. Abradable portion 150 radial distance "t" is typically in the range between about 0.5 mm and about 5 mm. In one embodiment, abradable portion 150 arcuate length "l" and width "w" is equal to the arcuate length and width of the arcuate seal carrier segment 140 (see FIG. 5). It will be appreciated that arcuate length and width of abradable portion 150 may vary depending upon the application.

Figure 2:
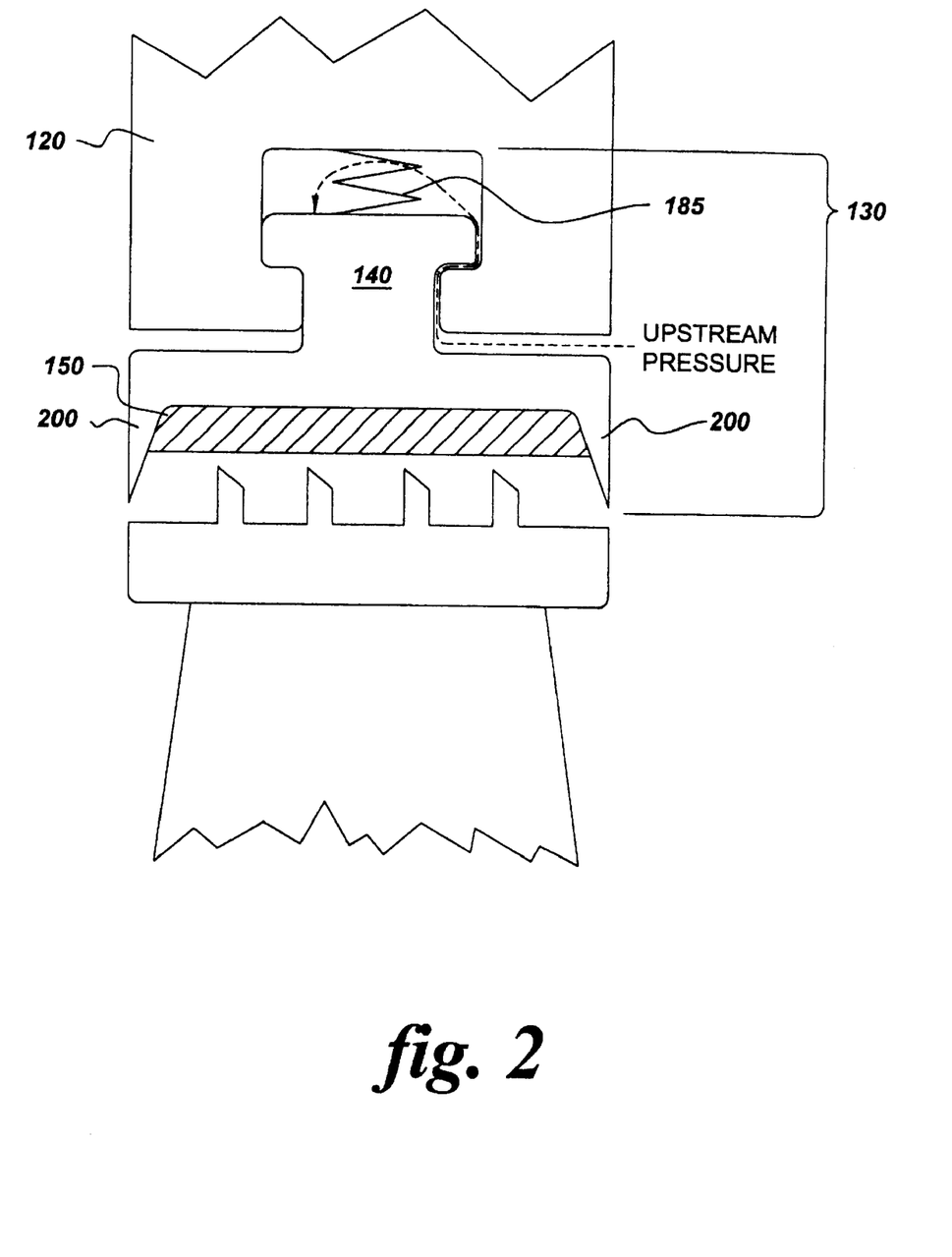
FIG. 2 is a schematic, cross-sectional exploded view of another embodiment of the instant invention.

In accordance with another embodiment of the instant invention (see FIG. 2), there is provided a springbacked abradable seal 130 formed by the combination of an abradable portion 150 and at least one labyrinth tooth 200. It will be appreciated that the location and number of labyrinth teeth 200 on arcuate seal carrier segment 140 may be varied. In one embodiment, labyrinth teeth 200 are typically located at the periphery of each arcuate seal carrier segment 140 as shown in FIG. 2. Here, at least one labyrinth tooth 200 profile extends 360° about the edge annular array of seal carrier segments (not shown).

Figure 3:
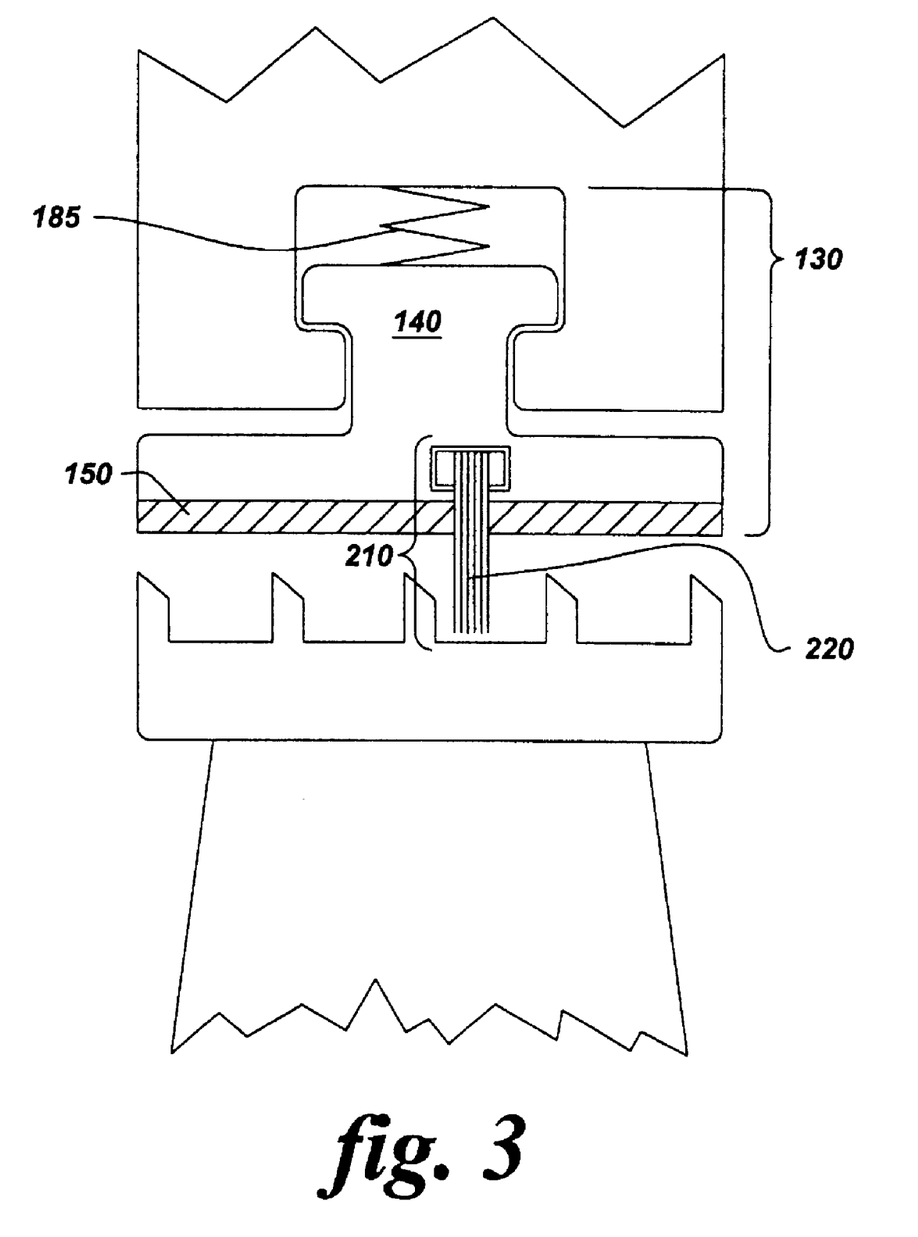
FIG. 3 is a schematic, cross-sectional exploded view of another embodiment of the instant invention.

In accordance with another embodiment of the instant invention (see FIG. 3), there is provided a springbacked abradable seal 130 formed by the combination of an abradable portion 150 and at least one brush seal 210. It will be appreciated that the location and number of at least one brush seal 210 may be varied depending upon desired application. In operation, it will be appreciated that the combined abradable portion 150 and at least one brush seal 210 may move radially inwardly and outwardly with the tips of the bristles 220 engaging the turbine bucket covers 180 substantially throughout the full 360° circumference of the rotor.

Figure 4:
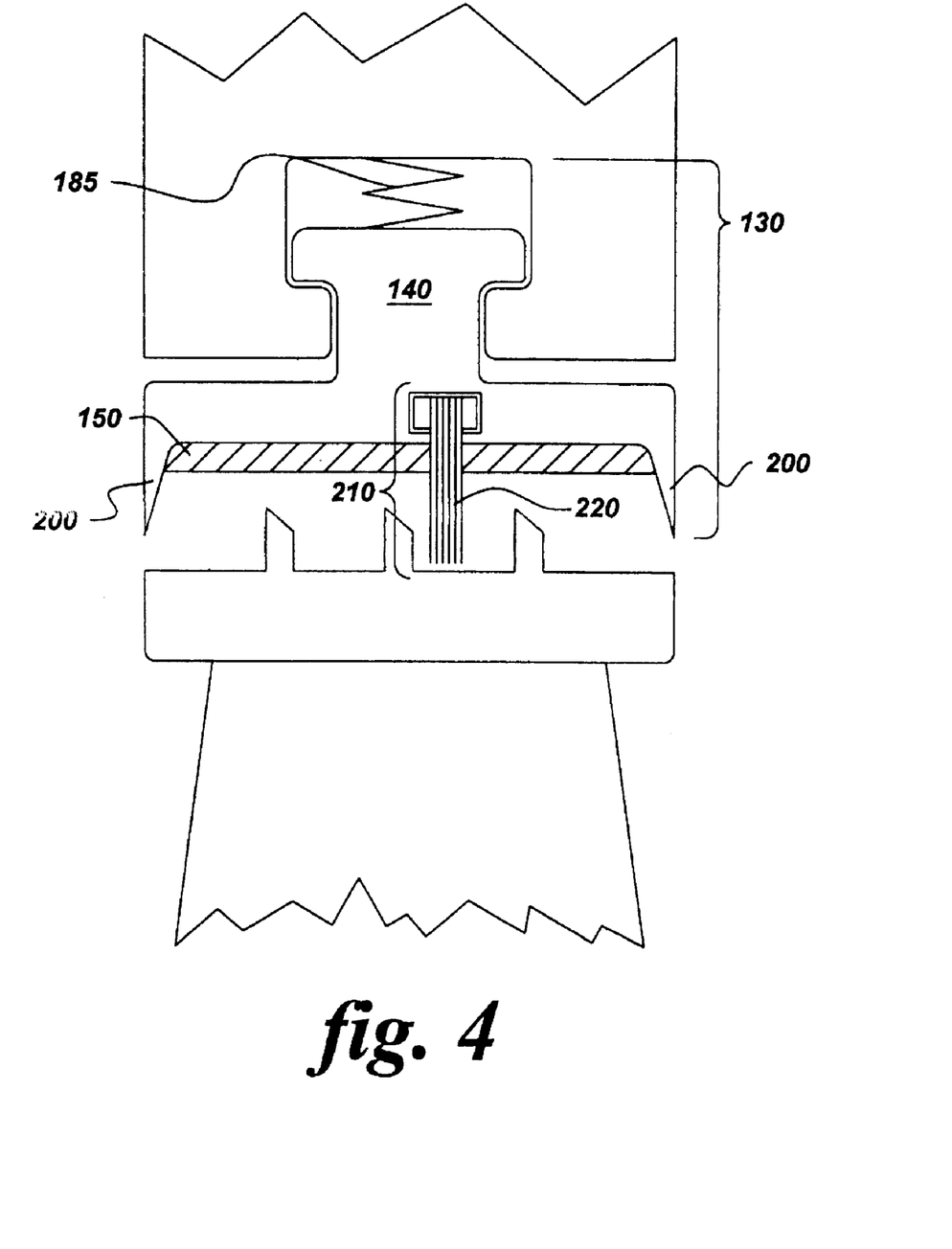
FIG. 4 is a schematic, cross-sectional exploded view of another embodiment of the instant invention.

In accordance with another embodiment of the instant invention (see FIG. 4), there is provided a springbacked abradable seal 130 formed by the combination of an abradable portion 150, at least one brush seal 210 and at least one labyrinth tooth 200. It will be appreciated that the location and number of at least one brush seal 210 and at least one labyrinth tooth 200 may be varied depending upon desired application. For example, in steam or gas turbines, solid particles are typically centrifuged outward at the blade tips. The labyrinth tooth 200 and brush seal 210 serve as auxiliary seals in case of excessive erosion of the abradable portion. Depending upon at least one brush seal 210 bristle angle, there may be a lack of bristles 220 at the ends of arcuate seal carrier segment 140. The lack of bristles 220 at the ends of arcuate seal carrier segment 140 does seriously compromise or degrade the sealing capability because of the structural combination with abradable portion 150, at least one labyrinth tooth 200 or both.

It will be apparent to those skilled in the art that, while the invention has been illustrated and described herein in accordance with the patent statutes, modification and changes may be made in the disclosed embodiments without departing from the true spirit and scope of the invention. It is, therefore, to be understood that the appended claims are intended to cover all such modifications and changes as fall within the true spirit of the invention.

What is claimed is:

1. An annular turbine seal assembly for disposition in a turbine between a rotatable component having an axis of rotation and a turbine housing about said axis, said annular turbine seal assembly comprising:
   a plurality of abradable seals, each of said abradable seals comprising an arcuate seal carrier segment, an abradable portion secured to said arcuate seal carrier segment, and at least one rib disposed on the rotatable component and opposite to said abradable portion; and
   at least one spring disposed so as to exert a force to maintain said abradable seal disposed adjacent to said rotatable component during rotation.

2. The annular turbine seal assembly of claim 1, wherein said abradable portion has an operating temperature in a range between about 20° C. and about 700° C.

3. The annular turbine seal assembly of claim 1, wherein the rotatable component comprises a plurality of turbine buckets, each of the turbine buckets having a bucket cover, and wherein each of said ribs projects from a respective one of the bucket covers.

4. The annular turbine seal assembly of claim 3, wherein each of said abradable seals comprises a plurality of said ribs projecting from a respective one of the bucket covers.

5. The annular turbine seal assembly of claim 1, wherein each of said arcuate seal carrier segments comprises at least one labyrinth tooth.

6. The annular turbine seal assembly of claim 5, wherein said labyrinth tooth is disposed at an outer periphery of the respective one of said arcuate seal carrier segments.

7. An annular turbine seal assembly for disposition in a turbine between a rotatable component having an axis of rotation and a turbine housing about said axis, said annular turbine seal assembly comprising:
   a plurality of abradable seals, each of said abradable seals comprising an arcuate seal carrier segment and an abradable portion secured to said arcuate seal carrier segment, wherein said arcuate seal carrier segment comprises at least one labyrinth tooth; and
   at least one spring disposed so as to exert a force to maintain said abradable seal disposed adjacent to said rotatable component during rotation.

8. The annular turbine seal assembly of claim 7, wherein said labyrinth tooth is disposed at an outer periphery of said arcuate seal carrier segment.

9. The annular turbine seal assembly of claim 7, wherein said abradable seal further comprises at least one brush seal.

10. The annular turbine seal assembly of claim 7, wherein said at least one abradable portion has a radial distance in a range between about 0.5 mm and about 5 mm.

11. The annular turbine seal assembly of claim 7, wherein said at least one abradable portion has a width equal to said arcuate seal carrier segment width.

12. The annular turbine seal assembly of claim 7, wherein said at least one abradable portion has an arcuate length equal to said arcuate seal carrier segment length.

13. The annular turbine seal assembly of claim 7, wherein said spring comprises a leaf spring.

14. The annular turbine seal assembly of claim 7, wherein said at least one spring comprises a plurality of springs, each of said springs being disposed on a respective one of said arcuate seal carrier segments.

15. The annular turbine seal assembly of claim 7, wherein said spring is disposed on a plurality of said arcuate seal carrier segments.

16. The annular turbine seal assembly of claim 7, wherein said abradable portion comprises NiCrAl and clay.

17. The annular turbine seal assembly of claim 16, wherein said clay comprises bentonite.

18. The annular turbine seal assembly of claim 7, wherein said abradable portion comprises nickel and graphite.

19. The annular turbine seal assembly of claim 7, wherein said abradable portion comprises stainless steel.

20. The annular turbine seal assembly of claim 7, wherein said abradable portion comprises chromium and aluminum and least one member of the group consisting of yttrium, iron, nickel and cobalt.

21. The annular turbine seal assembly of claim 7, wherein said abradable portion comprises a nickel based alloy.

22. An annular turbine seal assembly, for disposition in a turbine between a rotatable component having an axis of rotation and a turbine housing about said axis, said annular turbine seal assembly comprising:
   a plurality of abradable seals, each of said abradable seals comprising an arcuate seal carrier segment and an abradable portion secured to said arcuate seal carrier segment, wherein said abradable seal comprises at least one brush seal; and
   at least one spring disposed so as to exert a force to maintain said abradable seal disposed adjacent to said rotatable component during rotation.

23. An annular turbine seal assembly, for disposition in a turbine between a rotatable component having an axis of rotation and a turbine housing about said axis, said annular turbine seal assembly comprising:
   a plurality of abradable seals, each of said abradable seals comprising an arcuate seal carrier segment and an abradable portion secured to said arcuate seal carrier segment; and
   at least one spring disposed so as to exert a force to maintain said abradable seal disposed adjacent to said rotatable component during rotation, wherein said spring comprises a coil spring.

24. An annular turbine seal assembly, for disposition in a turbine between a rotatable component having an axis of rotation and a turbine housing about said axis, said annular turbine seal assembly comprising:
   a plurality of abradable seals, each of said abradable seals comprising an arcuate seal carrier segment and an abradable portion secured to said arcuate seal carrier segment; and
   at least one spring disposed so as to exert a force to maintain said abradable seal disposed adjacent to said rotatable component during rotation, wherein said spring is disposed on an entirety of said arcuate seal carrier segments.

25. An annular turbine seal assembly, for disposition in a turbine between a rotatable component having an axis of rotation and a turbine housing about said axis, said annular turbine seal assembly comprising:
   a plurality of abradable seals, each of said abradable seals comprising an arcuate seal carrier segment and an abradable portion secured to said arcuate seal carrier segment, wherein said abradable portion comprises CoNiCrAlY and further comprises material selected from the group consisting of hexagonal BN, thermoset polymer and mixtures thereof; and
   at least one spring disposed so as to exert a force to maintain said abradable seal disposed adjacent to said rotatable component during rotation.

26. The annular turbine seal assembly of claim 25, wherein said thermoset polymer is selected from the group consisting of a polyester and a polyimide.

27. An annular turbine assembly, for disposition in a turbine between a rotatable component having an axis of rotation and a turbine housing about said axis, said annular turbine seal assembly comprising:

a plurality of abradable seals, each of said abradable seals comprising an arcuate seal carrier segment and an abradable portion secured to said arcuate seal carrier segment, wherein said abradable portion comprises NiCrFeAlBN; and at least one spring disposed so as to exert a force to maintain said abradable seal disposed adjacent to said rotatable component during rotation.

28. A rotary machine having a plurality of stages comprising:

(a) a rotatable component;

(b) a fixed component surrounding said rotatable component, said components lying about a common axis;

(c) a plurality of abradable seals disposed between said rotatable component and said fixed component, each of said abradable seals comprising a seal carrier segment, an abradable portion OH secured to said seal carrier segment, and at least one rib disposed on the rotatable component and opposite to said abradable portion; and (d) at least one spring disposed so as to exert a force to maintain said abradable seals disposed adjacent to said rotatable component.

29. The rotary machine of claim 28, wherein said rotary machine is a steam turbine.

30. The rotary machine of claim 28, wherein said rotary machine is a gas turbine.

31. The rotary machine of claim 28, wherein said abradable portion has an operating temperature in a range between about 20° C. and about 700° C.

32. The rotary machine of claim 28, wherein said rotatable component comprises a plurality of turbine buckets, each of said turbine buckets having a bucket cover, and wherein each of said ribs projects from a respective one of said bucket covers.

33. The rotary machine of claim 32, wherein each of said abradable seals comprises a plurality of said ribs projecting from a respective one of said bucket covers.

34. The rotary machine of claim 28, wherein each of said arcuate seal carrier segment comprises at least one labyrinth tooth.

35. The rotary machine of claim 34, wherein said labyrinth tooth is disposed at an outer periphery of the respective one of said arcuate seal carrier segments.

36. A rotary machine having a plurality of stages comprising:

(a) a rotatable component;

(b) a fixed component surrounding said rotatable component, said components lying about a common axis;

(c) a plurality of abradable seals disposed between said rotatable component and said fixed component, each of said abradable seals comprising a seal carrier segment, an abradable portion secured to said seal carrier segment; and (d) at least one spring disposed so as to exert a force to maintain said abradable seals disposed adjacent to said rotatable component, wherein said arcuate seal carrier segment comprises at least one labyrinth tooth.

37. The rotary machine of claim 36, wherein said labyrinth tooth is disposed at an outer periphery of said arcuate seal carrier segment.

38. The rotary machine of claim 36, wherein each of said abradable seals further comprises at least one brush seal.

39. The rotary machine of claim 36, wherein said abradable seal further comprises at least one brush seal.

40. The rotary machine of claim 36, wherein said at least one abradable portion has a radial distance in a range between about 0.5 mm and about 5 mm.

41. The rotary machine of claim 36, wherein said at least one abradable portion has a width equal to said arcuate seal carrier segment width.

42. The rotary machine of claim 36, wherein said at least one abradable portion has an arcuate length equal to said arcuate seal carrier segment length.

43. The rotary machine of claim 36, wherein said spring comprises a leaf spring.

44. The rotary machine of claim 36, wherein said spring comprises a coil spring.

45. The rotary machine of claim 36, wherein said at least one spring comprises a plurality of springs, each of said springs being disposed on a respective one of said arcuate seal carrier segments.

46. The rotary machine of claim 36, wherein said spring is disposed on a plurality of said arcuate seal carrier segments.

47. The rotary machine of claim 36, wherein said spring is disposed on an entirety of said arcuate seal carrier segments.

48. The rotary machine of claim 36, wherein said abradable portion comprises CoNiCrAlY and further comprises material selected from the group consisting of hexagonal BN, thermoset polymer and mixtures thereof.

49. The rotary machine of claim 48, wherein said thermoset polymer is selected from the group consisting of a polyester and a polyimide.

50. The rotary machine of claim 36, wherein said abradable portion comprises NiCrAl and clay.

51. The rotary machine of claim 50, wherein said clay comprises bentonite.

52. The rotary machine of claim 36, wherein said abradable portion comprises nickel and graphite.

53. The rotary machine of claim 36, wherein said abradable portion comprises NiCrFeAlBN.

54. The rotary machine of claim 36, wherein said abradable portion comprises stainless steel.

55. The rotary machine of claim 36, wherein said abradable portion comprises chromium and aluminum and least one member of the group consisting of yttrium, iron, nickel and cobalt.

56. The rotary machine of claim 36, wherein said abradable portion comprises a nickel based alloy.

* * * * *

UNITED STATES PATENT AND TRADEMARK OFFICE
CERTIFICATE OF CORRECTION

PATENT NO.    : 6,547,522 B2
DATED         : April 15, 2003
INVENTOR(S)   : Norman Arnold Turnquist et al.

It is certified that error appears in the above-identified patent and that said Letters Patent is hereby corrected as shown below:

Column 7,
Line 4, "an abradable portion OH secured to said seal carrier" should read -- an abradable portion secured to said seal carrier --

Signed and Sealed this

Fourteenth Day of December, 2004

JON W. DUDAS
*Director of the United States Patent and Trademark Office*